June 12, 1951            J. BINSFELD            2,556,570

TRUCK TIRE CARRIER

Filed Jan. 12, 1949

INVENTOR
JOHN BINSFELD.
BY *J. Harold Nickles*
ATTORNEY

Patented June 12, 1951

2,556,570

UNITED STATES PATENT OFFICE 2,556,570

TRUCK TIRE CARRIER

John Binsfeld, Toronto, Ontario, Canada

Application January 12, 1949, Serial No. 70,456
In Canada January 13, 1948

4 Claims. (Cl. 224—42.08)

My invention relates to a device for carrying spare tires by trucks and trailers. In particular, the object of my invention is to facilitate and to render more simple the release of a spare tire and wheel from its carrier for replacement of a tire, the said machine being of simple construction and operation and making the said spare tire readily accessible at all times for removal with a minimum of effort.

An understanding of the manner in which the above and other objects of the invention are attained may be had from the following description, reference being made to the accompanying drawing in which.

Figure 1:
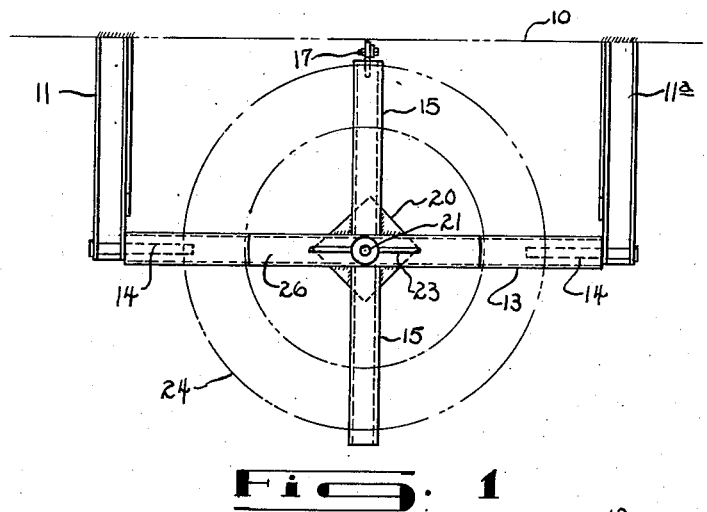
Figure 1 is an elevation illustrating the position of the spare tire ready for attachment to or detachment from the device.
Figure 2:
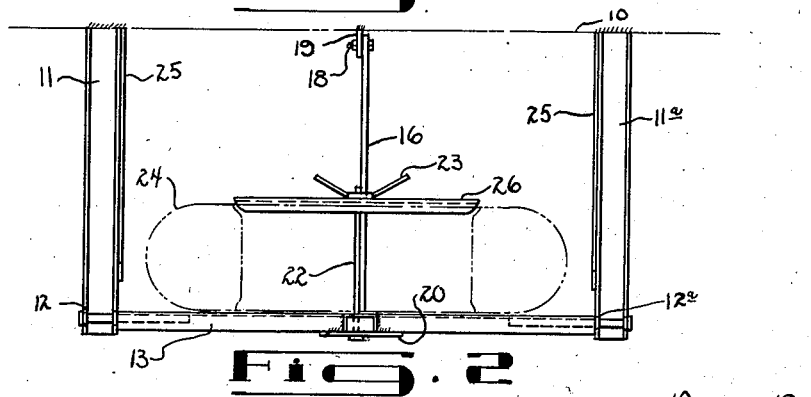
Figure 2 is an elevation of the said device indicating the position of the tire and wheel in the horizontal or carrying position.
Figure 4:
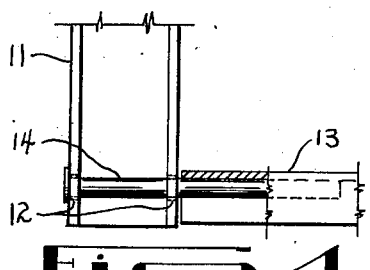
Figure 4 is a detail view of the assembled parts of the device at the point of rotation of the mechanism.
Figure 3:
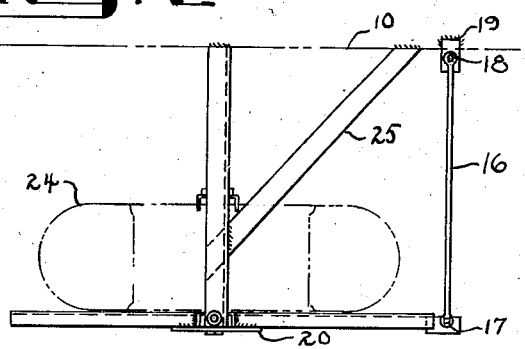
Figure 3 is a side elevation of the invention illustrating the position of the tire and wheel when carried.

Referring to the drawings, the numeral 10 indicates the platform of a truck or trailer. The upper ends of the vertical members 11—11a are welded or otherwise firmly secured to the underside of the platform 10. These members are spaced apart a distance sufficient to receive between them a spare tire and rim assembly.

The lower ends of the members 11—11a are provided with openings 12—12a which are adapted to receive the ends of the horizontal member 13. These openings may be provided with sleeves to form bearing surfaces for the ends of the horizontal member 13.

The horizontal member 13 extends between the vertical members 11—11a with its ends rotatably journalled in the openings 12—12a.

A pin 14 is extended through each opening 12—12a into the body of each end of the horizontal member and is secured at its outer end to the member 11 or 11a. These pins act as pivot points for the member 13 and also serve to keep the lower ends of the members 11—11a from spreading apart.

A second horizontal member 15 is positioned at right angles to the member 13 and extends across the centre thereof. The inward end of this member 15 is fixedly secured to the lower end of the vertical member 16, such as by an eye bolt 17. This vertical member 16 is detachably secured to the underside of the platform 10, such as by a bolt 18 which is extended through a plate 19 carried by the undersurface of the platform.

The crossed horizontal members 13 and 15 are secured firmly together at their point of intersection by a plate 20 which is welded or otherwise secured to the members.

An opening 21 is provided in the centre of horizontal members and a bolt 22 is extended upwardly through this opening. The spare tire and rim assembly, indicated by the numeral 24, is mounted on this bolt and held firmly in place by a wing nut 23. Preferably a plate 26 is positioned between the wing nut and the tire.

If desired the structure may be reinforced by struts 25 which extend at an angle from the members 11—11a to the underside of the platform.

All parts of the device are preferably formed of metal or other suitable material capable of bearing the load and withstanding the stresses and strains to which the structure is subjected.

In operation, the vertical member 16 is disengaged from the platform and the horizontal member 13 is rotated through 90° in which position the tire and rim assembly faces the operator, with the lower part adjacent to the surface of the ground. The length of the vertical members 11, 11a and 16 may be readily adjusted at the time of installation so that in its releasing or attaching position the tire, when inflated is slightly above the ground level. The wing nut may then be loosened and the tire released from its attachment to the members 13 and 15.

The device of the present invention has important advantages over the tire carriers of the prior art. Firstly, the carrier may be manufactured and installed inexpensively. When installed, the tire and rim assembly are carried safely without danger of disengagement. When it is desired to detach the tire from the carrier, the vertical member 16 is very easily disengaged from its attachment to the underside of the platform and the horizontal member 13 rotated to bring the tire in a vertical position facing the operator from which it may be readily detached from the horizontal member and rolled away. If desired, a wedge block can be carried with the tire changing tools so that when the tire is in a vertical position the wedge block can be slipped underneath it thus eliminating any lifting of the tire. Thus, there is no inconvenience or labor necessary in detaching the tire assembly from the carrier which is otherwise required in the use of conventional tire carriers.

It will be understood, of course, that modifications may be made in the preferred embodiment of the invention described and illustrated herein without departing from the scope of the invention as defined by the appended claims.

What I claim as new and desire to protect by Letters Patent of the United States is:

1. A tire carrier which comprises spaced vertical members secured at their upper ends to the underside of a platform, a horizontal member rotatably journalled in and extending between the lower ends of the vertical members, a second horizontal member extending at right angles across the centre of the first mentioned horizontal member, a vertical member connected at its lower end to the second mentioned horizontal member with its upper end releasably connected to the underside of the platform, and means for releasably securing a spare tire to said horizontal members between said spaced vertical members.

2. A tire carrier which comprises spaced vertical members secured at their upper ends to the underside of a platform, a horizontal member rotatably journalled in and extending between the lower ends of the vertical members, a second horizontal member secured to and extending across the centre of the first mentioned horizontal member, a vertical member connected at its lower end to the second mentioned horizontal member with its upper end releasably connected to the underside of the platform, and means for releasably securing a spare tire to said horizontal members between said spaced vertical members.

3. A tire carrier which comprises spaced vertical members secured at their upper ends to the underside of a platform, struts extending between the underside of the platform and said vertical members for reinforcing said vertical members to maintain them in their fixed position under load, a horizontal member rotatably journalled in and extending between the lower ends of the vertical members, a second horizontal member extending at right angles across the centre of the first mentioned horizontal member, a vertical member connected at its lower end to the second mentioned horizontal member with its upper end releasably connected to the underside of the platform, and means for releasably securing a spare tire to said horizontal members between said vertical members.

4. A tire carrier which comprises spaced vertical members secured at their upper ends to the underside of a platform, a horizontal member rotatably journalled in and extending between the lower ends of the vertical members, pins extending through the lower ends of said vertical members into the body of the horizontal member to support the ends of said horizontal member and to retain the lower ends of said vertical members in their predetermined spaced relation, a second horizontal member extending at right angles across the centre of the first mentioned horizontal member, a vertical member connected at its lower end to the second mentioned horizontal member with its upper end releasably connected to the underside of the platform, and means for releasably securing a spare time to said horizontal members between said vertical members.

JOHN BINSFELD.

REFERENCES CITED

The following references are of record in the file of this patent:

UNITED STATES PATENTS

| Number    | Name    | Date          |
|-----------|---------|---------------|
| 1,713,896 | Fournet | May 21, 1929  |
| 1,913,835 | Golike  | June 13, 1933 |